United States Patent [19]
Chiba

[11] Patent Number: 5,485,489
[45] Date of Patent: Jan. 16, 1996

[54] CARRIER RECOVERY CIRCUIT FOR OFFSET QPSK DEMODULATORS

[75] Inventor: Kenichiro Chiba, Tokyo, Japan

[73] Assignee: NEC Corporation, Tokyo, Japan

[21] Appl. No.: 286,464

[22] Filed: Aug. 5, 1994

[30] Foreign Application Priority Data

Aug. 5, 1993 [JP] Japan ................................. 5-215288

[51] Int. Cl.$^6$ ........................... H04L 27/06; H03D 3/18
[52] U.S. Cl. ...................... 375/344; 375/327; 329/307
[58] Field of Search ................................ 375/97, 83, 86, 375/80, 81, 84; 455/255, 257; 329/306, 307, 323, 325

[56] References Cited

U.S. PATENT DOCUMENTS

| 4,871,975 | 10/1989 | Nawata et al. | 329/124 |
| 5,150,384 | 9/1992 | Cahill | 375/97 |

FOREIGN PATENT DOCUMENTS 2-1675  5/1990  Japan .

Primary Examiner—Stephen Chin
Assistant Examiner—Huong Luu
Attorney, Agent, or Firm—Sughrue, Mion, Zinn, Macpeak & Seas

[57] ABSTRACT

The present invention relates to a carrier recovery (CR) circuit for recovering carriers from offset quadrature phase shift keying (O-QPSK) modulated carriers, in which each of two orthogonal sequences of burst signals, to be modulated by the O-QPSK system, has a preamble field set in a prescribed bit pattern. In a Costas loop for recovering carriers by the QPSK system, a ½ symbol delay circuit makes the phases of burst signals inputted to two orthogonal channels identical to each other. A phase comparator for the bit timing recovery field adds with an adder 193 a detected carrier value detected by an arc tangent calculating circuit and a value resulting from the delaying of the detected carrier value with a one-symbol delay circuit, and supplies the added detected carrier value. A switching circuit switches and supplies the outputs of phase comparators, and enters the output into a loop filter.

8 Claims, 10 Drawing Sheets

NO SAMPLE TIMING ERROR
NO CARRIER PHASE OFFSET

SAMPLE TIMING ERROR
NO CARRIER PHASE OFFSET

NO SAMPLE TIMING ERROR
CARRIER PHASE OFFSET

SAMPLE TIMING ERROR
CARRIER PHASE OFFSET

FIG. 16
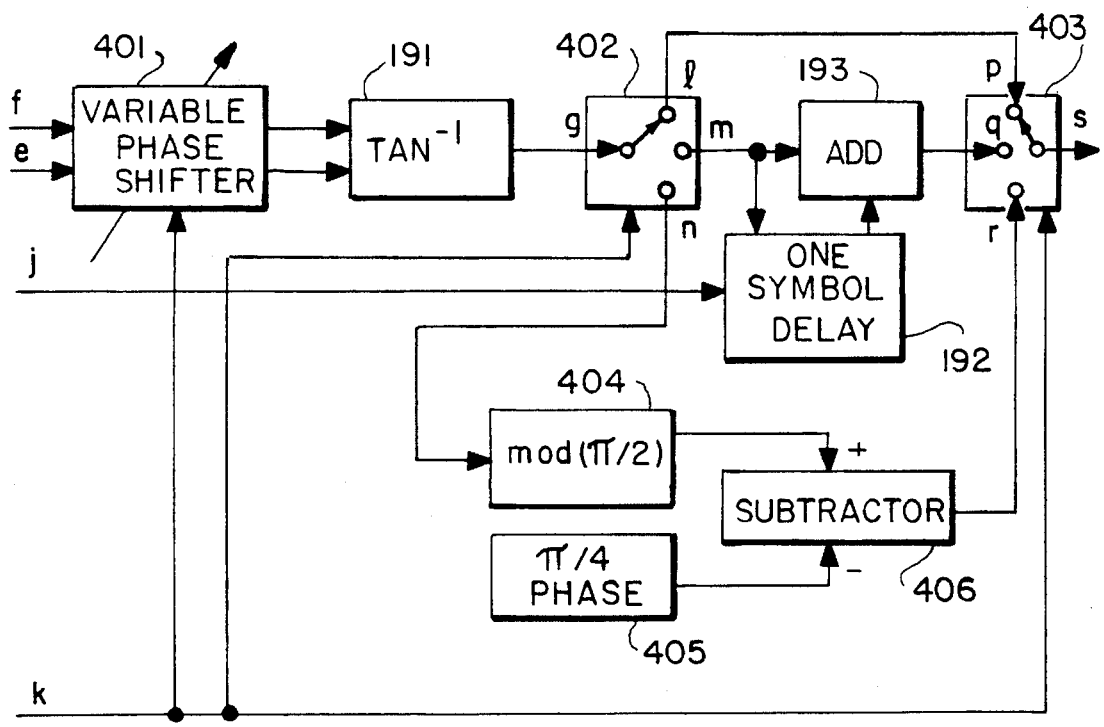
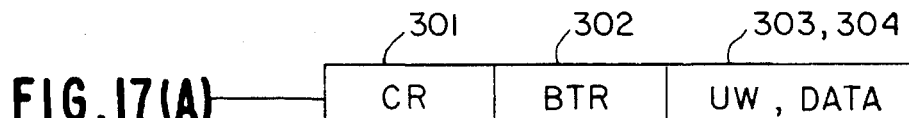
FIG. 17(A)
FIG. 17(B)
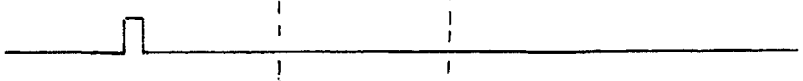
FIG. 17(C)
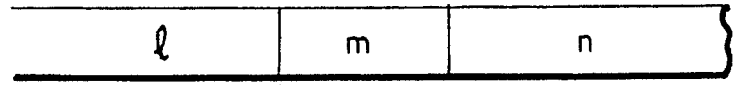
FIG. 17(D)
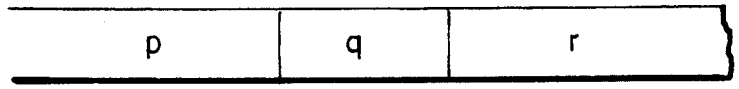

CARRIER RECOVERY CIRCUIT FOR OFFSET QPSK DEMODULATORS

BACKGROUND OF THE INVENTION

The present invention relates to a carrier recovery (CR) circuit, and more particularly to a CR circuit for offset quadrature phase shift keying (O-QPSK) modulators in which the preamble field of two sequences of burst signals, which undergo quadrature modulation by the O-QPSK system, is set in a prescribed bit pattern.

Both the O-QPSK system and the quadrature phase shift keying (QPSK) system are digital signal modulating systems having the common feature that two carriers of two series of binary digits, differing in phase from each other by 90°, undergo two-phase modulation to generate two modulated carriers in an orthogonal relationship to each other, and four-phase modulated carriers, resulting from the addition of the modulated carriers to the initial two carriers, are sent out to the transmission path, but there is the difference between them, as illustrated in FIG. 2, in the phase relationship between the two series of binary digits.

Thus, while the phase transition of binary digits (data) of two series on the in-phase channel (I-channel) and the quadrature channel (Q-channel) occur at the same time in the QPSK system as shown in FIG. 2 (A), those of data of two series on the I-channel and the Q-channel in the O-QPSK system arise in the middle of each other's data transmission periodic.

Since 180° phase transition doesn't occur in the O-QPSK system as a result, there arises an effect to suppress the envelope fluctuations of modulated carriers, which means less susceptibility to non-linear distortions from a non-linear transmission path. Therefore, in a system having inevitable non-linear characteristics on the transmission path such as a satellite communication system, the O-QPSK system has an advantage over the QPSK system, and accordingly is used more frequently in satellite communication systems.

In a satellite communication system using Time Division Multiple Access (TDMA), signals are transmitted in the form of a succession of short-duration bursts. So that the burst signals can be efficiently demodulated in a short demodulator signal acquisition time, they have a bit structure that a preamble field 300 consisting of a Carrier Recovery field (CR field) 301 and an ensuing Bit Timing Recovery field (BTR field) 302 precedes a Unique Word (UW) 303 at the top of a data field 304 as shown in FIG. 3. In the CR field 301 and the BTR field 302, fixed bit patterns are set for the carrier recovery and bit timing recovery, respectively.

It is well known that, in a satellite communication system based on the O-QPSK system in which carrier recovery and clock recovery are closely related to each other, the CR field 301 and the BTR field 302 of the preamble field 300 of said burst signals should most desirably have such patterns as are illustrated in FIG. 4.

On the I-channel of the two orthogonal sequences in the O-QPSK system, both the signal for carrier recovery in the CR field 301 and that for bit timing recovery in the BTR field 302 wholly consist of binary 1's (or 0's) as shown in FIG. 4 (A). However, on the Q-channel, that in the CR field 301 wholly consists of binary 1's (or 0's), while that in the BTR field 302 is an alternating series of binary 1's and 0's as shown in FIG. 4 (B).

When the O-QPSK modulated carriers differing in composition of the preamble field 300 between the two sequences of signals as described above are to be demodulated by synchronous detection, there arises the problem of how to configure the CR circuit. As the CR circuit in the QPSK system uses a Costas loop (phase locked loop), the use of this Costas loop is conceivable in the O-QPSK system as well.

However, in a satellite communication system, demodulation is accomplished under a low C/N ratio (the ratio of carrier power to noise power) condition and, moreover, the preamble field is minimized in length with a view to enhancing the utilization efficiency of signals. Thus, carrier recovery may not be completed within the duration of the CR field 301, leaving a phase error of the carrier at the beginning of the BTR field 302. Therefore, it is essential to enable carrier recovery to be carried over into the BTR field 302.

However, since it is usual that no clock synchronization is as yet achieved at the beginning of the BTR field 302, there is the problem that, even if a delay circuit is inserted into the Costas loop to make the phase between I-channel data and Q-channel data coincident, carrier recovery may become impossible in the BTR field 302 if the preamble field is composed as shown in FIG. 4.

Thus, if the carrier recovery is attempted with the BTR field 302 of the composition of FIG. 4 in a state where proper sample timing is not achieved, an error will arise in the estimated phase value obtained by a phase comparator in the Costas loop, and if a voltage controlled oscillator (VCO) is controlled by the output of loop filter contained the phase error, the CR circuit may become unlocked.

In view of this problem, when a CR circuit according to the prior art detects the arrival of the BTR field, a prescribed binary pattern (1010) instead of the output of a four-phase comparator is applied to the input of the loop filter for the duration of the BTR field.

FIG. 1 illustrates the configuration of this prior art CR circuit. In this diagram, reference numerals 11 and 12 denote multipliers; 13, a π/2 phase shifter; 15, a Voltage Controlled Oscillator (VCO); 50, a switch, 23, a loop filter; 16, a BTR field detector (BTR DET); and 21, a control circuit (CONT).

In this configuration, in the Costas loop for carrier recovery in the O-QPSK system, a ½ symbol delay circuit 14 for delaying by ½ symbol rate is inserted in order to coincide the phase transitions between the I and Q channels of burst signals entered into the two orthogonal channels, and at the same time the switch 50 is provided on the input of the loop filter 23, with the BTR field detector 16 and the control circuit 21 further being provided to control this switch 50.

This configuration enables the control circuit 21 to control the switch 50 so that the output of the four-phase comparator (4φ COMP) 20 will be made the input to the loop filter 23 during the CR field 301 of the preamble field shown in FIG. 4 and, when the BTR field 302 begins, digital signals having a bit pattern of binary (0101 . . . 01) will be made the input to the loop filter 23. As a result, when the BTR field 302 begins, the output of the loop filter 23 takes on a prescribed value of a low level, so that the CR operation is prevented from being affected by the failure to recover the optimal timing at the beginning of the BTR field 302.

The foregoing configuration is described in, for example, the Japanese Patent Disclosure Gazette No. 1990-1675. The U.S. Pat. No. 4,871,975 also refers to a carrier recovery circuit for offset QPSK demodulators.

In this configuration, during the BTR field, the carrier can be stably recovered, without being affected by sample timing, by projecting the vector of received signals on one axis of the phase plane and using the amplitude of that projected vector as input to the loop filter.

The CR circuit described above, however, involves the problem that the Costas loop controls in the BTR field is not accomplished on the basis of an accurately determined phase error of the carrier but on the basis of a phase difference approximated by using the difference of the projected vector. Moreover, as the input to the loop filter oscillates symbol by symbol, the control voltage for the VCO supplied from the loop filter is accompanied by jitter, which prevents the band of the loop filter from being widened under low C/N ratio condition.

SUMMARY OF THE INVENTION

The object of the present invention, attempted in view of the foregoing problems, is to provide a CR circuit in which frequency estimate errors due to the phase errors of the sampling clock are reduced in recovering carrier from O-QPSK modulated carriers.

In order to achieve the aforementioned object, according to the invention, there is provided a carrier recovery (CR) circuit for recovering carriers from offset quadrature phase shift keying (O-QPSK) modulated carriers, in which each of two orthogonal sequences of burst signals, to be modulated by the O-QPSK system, has a composition in which a preamble field, comprising a CR field and a bit timing recovery (BTR) field in a time series in that order, precedes a data field and the CR field in both sequences has a pattern fixed to one of two binary values while the BTR field of one of the two sequences has a pattern fixed to one of two binary values and that of the other has a pattern of an alternating series of two binary values, having first and second multiplying means for multiplying the O-QPSK carriers by respectively first and second recovered carriers differing from each other by a $\pi/2$ phase; a detecting circuit for detecting said CR field from the output signals of the first and second multiplying means; a delay circuit for delaying the output signal from one of the first and second multiplying means by a ½ symbol rate; a clock recovery circuit for recovering the sampling clock on the basis of the output signal from either the first or the second multiplying means; a phase comparator for the CR field; a phase comparator for the BTR field; a four-phase comparator; selector means; and a recovered carrier generating circuit.

Here, said phase comparator for the CR field, phase comparator for the BTR field and four-phase comparator receive the one delayed by the delay circuit and the other not delayed from the output signals of said first and second multiplying means as their respective input signals, and convert phase conversion characteristics to that has one, two and four phase stabilization points, respectively. The selector means successively selects one out of the output signals of the comparator for the CR field, that for 1 the BTR field and the four-phase comparator on the basis of clocks from said clock recovery circuit. Further, the recovered carrier generating circuit generates a recovered carrier on the basis of the output signal of the selector means.

BRIEF DESCRIPTION OF THE DRAWINGS

The present invention will be described in further, detail below with reference to the accompanying drawings, in which:

FIG. 16 is a block diagram of one example of the variable phase comparator circuit in FIG. 15;

FIGS. 17A–17D are diagrams for describing the operation of the circuit illustrated in FIG. 15.

DETAILED DESCRIPTION OF THE PREFERRED EMBODIMENTS

Figure 5:
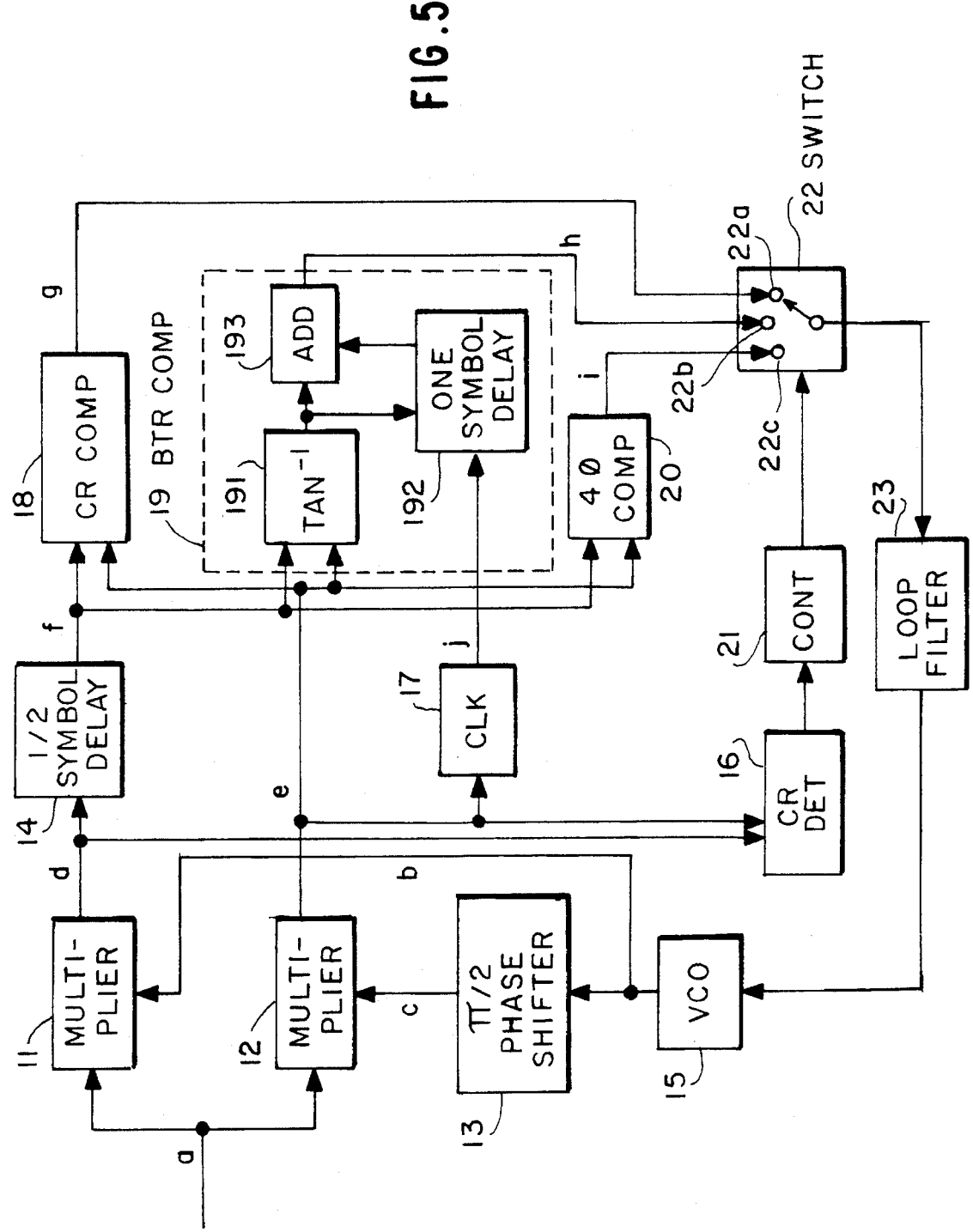
FIG. 5 is a block diagram of a first preferred embodiment of the present invention.

FIG. 5 is a block diagram of a first preferred embodiment of the present invention. Referring to the diagram, a multiplier 11 multiplies an input O-QPSK modulated carrier a by the output signal b of a voltage controlled oscillator (VCO) 15. A multiplier 12 multiplies the O-QPSK modulated carrier a by the output signal c of a $\pi/2$ phase shifter 13. A ½ symbol delay circuit 14 delays a signal d by a length of time equal to ½ of the symbol rate. The delay circuit 14 is provided, in converting O-QPSK signals, whose changing points have a ½ symbol lag between the I-channel and the Q-channel, into QPSK signals, to coincide the phase transitions between the I and Q channels.

Figure 3:
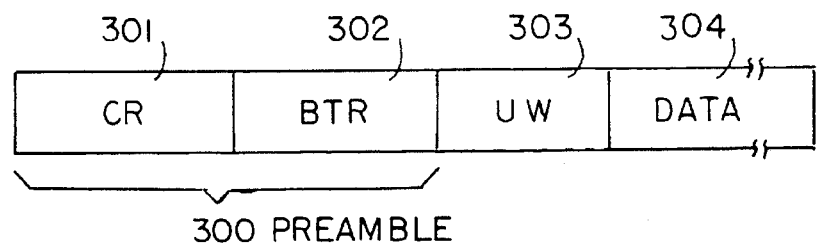
FIG. 3 is a diagram illustrating the composition of a burst signal.
Figure 4:
FIG. 4 is a diagram illustrating the compositions of the preamble fields of burst signals in the O-QPSK system.
Figure 4:
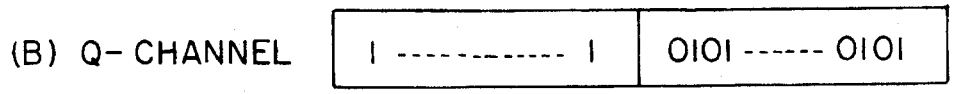
Figure 4:
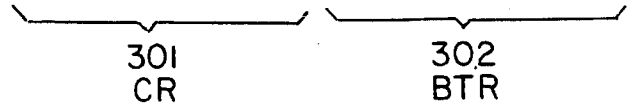
Figure 6:
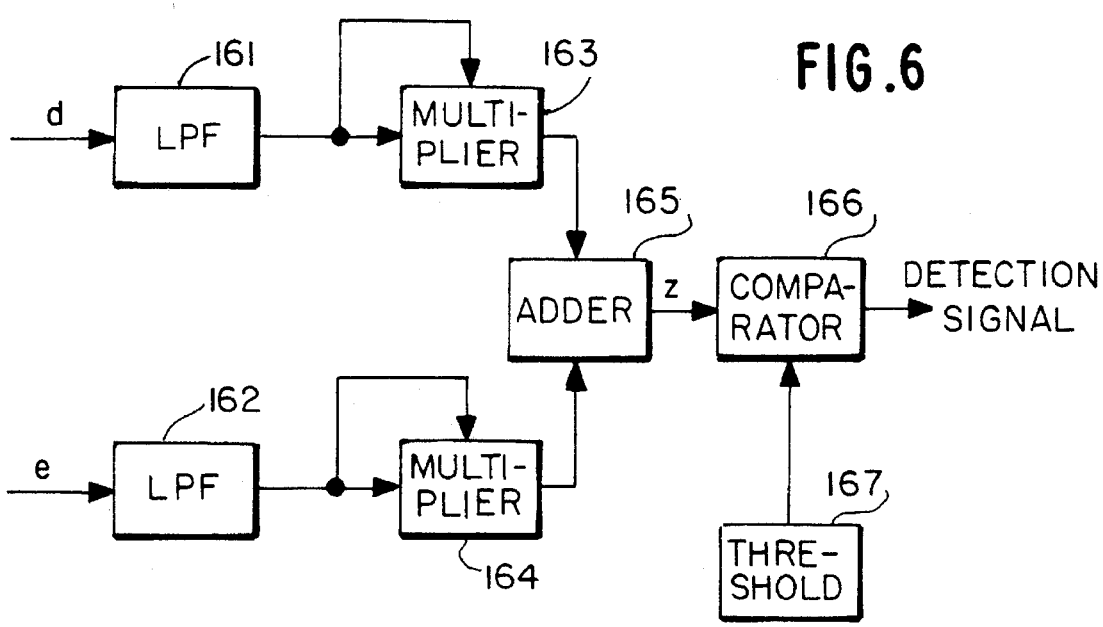
FIG. 6 is a block diagram of one example of the CR field detecting circuit in FIG. 5.

A CR field detecting (CR DET) circuit 16 is used for detecting the CR field 301 of the preamble field shown in FIGS. 3 and 4, and has such a detailed configuration as is shown in FIG. 6 for example. Referring to FIG. 6, the CR field detecting circuit 16 attenuates high-frequency noise in the output signals d and e of the multipliers 11 and 12, respectively, with low-pass filters (LPF) 161 and 162, and power is obtained by squaring the filtered output signals with multipliers 163 and 164 and adding the products with an adder 165. A detection signal is supplied by having a comparator 166 compares the output signal z of this adder 165 with a threshold value from a threshold setter (THRESHOLD) 167.

Here, while the output signal z for the CR field 301 increases to become greater than the output threshold of the threshold settler 167 because this field has the identical value on the I-channel and the Q-channel, that for the BTR field 302 does not become greater than said threshold because this field on the Q-channel is an alternating series of binary values. Nor does that for the data field, because this field has a random pattern on both channels. Therefore, when the output signal z becomes greater than said threshold, a detection signal indicating the input of the CR field 301 is supplied from the comparator 166.

Figure 7:
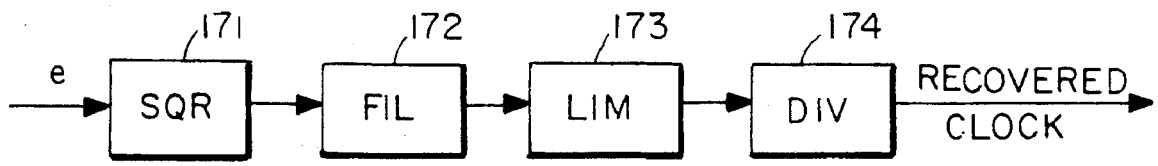
FIG. 7 is a block diagram of one example of the clock recovery circuit in FIG. 5.

The clock recovery circuit (CLK) 17 in FIG. 5 has the known configuration shown in FIG. 7 (see, e.g., Heiichi Yamamoto and Shuzo Kato, "TDMA Communication" (in Japanese), The Institute of Electronics, Information and Communication, Engineers p. 86). Referring to FIG. 7, the output signal e of the multiplier 12 is supplied to a ½ frequency divider (DIV) 174 via a squarer (SQR) 171, a mono-tunable filter (FIL) 172 and a limiter (LIM) 173 to be made the recovered clock. Since the BTR field 302 of the preamble field of burst signals in this embodiment is an alternating series of binary logic values on the Q-channel, the input to the squarer 171 comes from only one channel.

Referring again to FIG. 5, The output signal f of said delay circuit 14 and the output signal e of the multiplier 12 undergo phase comparison by a CR field phase comparator 18, a BTR field phase comparator 19 and a four-phase comparator 20. A switching circuit (SWITCH) 22 undergoes switching control by the output signal of a control circuit 21, selects one of the output phase error signals g, h and i of the CR field phase comparator (CR COMP) 18, the BTR field phase comparator (BTR COMP) 19 and the four-phase comparator (4φ COMP) 20, respectively, inputted to terminals 22a, 22b and 22c, and supplies the selected signal to a loop filter 23.

Next will be described the configurations of the CR field phase comparator (CR COMP) 18, the BTR field phase comparator 19 and the four-phase comparator 20. The BTR field phase comparator (BTR COMP) 19, into which said output signals f and e are entered, is a circuit for conversion to a phase characteristic having two phase stabilization points, and consists of an arc tangent calculating circuit (TAN$^{-1}$) 191 for calculating the arc tangents of the input signals to obtain the estimated phase value of the symbol; a one-symbol delay circuit 192 for delaying the output estimated phase value of the arc tangent calculating circuit 191 by one symbol period; and an adder (ADD) 193 for adding the output estimated phase value of the arc tangent calculating circuit 191 and the output of the one-symbol delay circuit 192 to supply a detected carrier phase value. The output signal of the adder 193 is supplied to the switching circuit 22.

Figure 8:
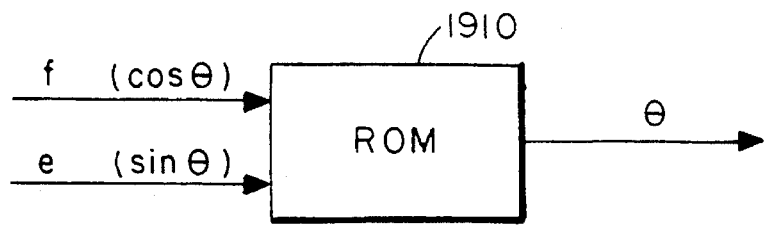
FIG. 8 is a block diagram of one example of the arc tangent calculating circuit in FIG. 5.

Into the arc tangent calculating circuit 191, consisting for instance of a read only memory (ROM) 1910 as illustrated in FIG. 8, are entered the signal e corresponding to sin θ and the signal f corresponding to cos θ and, referring to the calculation data of tan$^{-1}$ (sin θ/cos θ) stored in advance, supplies the data of θ.

Figure 9:
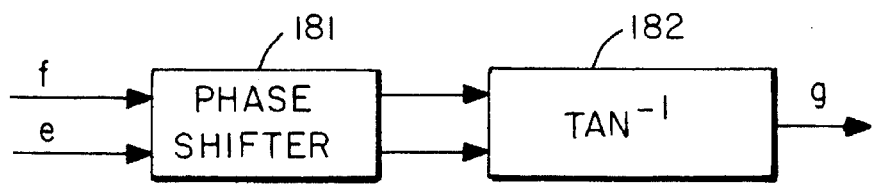
FIG. 9 is a block diagram of one example of the phase comparator for the CR field in FIG. 5.

The CR field phase comparator 18 is a circuit, into which said output signals f and e are entered, for conversion to a phase characteristic having one phase stabilization point, and consists, for example, of a phase shifter 181 and an arc tangent calculating circuit 182 as shown in FIG. 9. The quantity of phase shift by the phase shifter 181 is determined so that the output signal g of the arc tangent calculating circuit (TAN$^{-1}$) 182 manifest a displacement centering on the lock point. The arc tangent calculating circuit 182 has a similar circuitry to that of the arc tangent calculating circuit 191 shown in FIG. 8.

The output signal g of this CR phase comparator 18 is entered into the loop filter 23 through said switching circuit 22 during the reception of the CR field to pull in the carrier phase.

Figure 10:
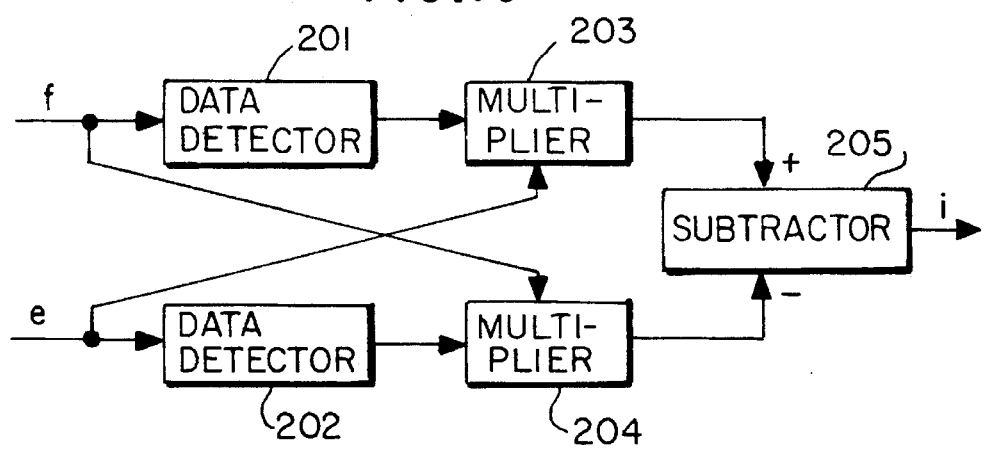
FIG. 10 is a block diagram of one example of the four-phase comparator in FIG. 5.

The four-phase comparator 20, into which said output signals f and e are entered, is a circuit for conversion to a phase characteristic having four phase stabilization points (e.g. π/4, 3π/4, 5π/4 and 7π/4), and consists of, for example, data detector 201 and 202 into which the signals f and e are respectively entered; a multiplier 203 into which the output signal of the sign discriminator 201 and the signal e are entered; a multiplier 204 into which the output signal of the sign discriminator 202 and the signal f are entered; and a subtractor 205 for subtraction between the output signals of the multipliers 203 and 204 as shown in FIG. 10. The output signal i of this four-phase comparator 20 is selected by the switching circuit 22 after the entry of the preamble field 300 is completed.

The CR circuit of the above-described configuration, which is the embodiment of the invention illustrated in FIG. 5, has the delay circuit 14 inserted to make the phases of burst signals to be entered into two orthogonal channels identical to each other in the Costas loop for carrier recovery by the QPSK system; is further provided with the switching circuit 22 on the input side of the loop filter 23, and with the CR field detecting circuit 16 and the control circuit 21 to control the switching circuit 22; uses the arc tangent calculating circuit 191 in the BTR field phase comparator 19; and, by providing the one-symbol delay circuit 192, uses as the output of the BTR field comparator 19 the sum of an output signal of the arc tangent calculating circuit 191 and another output signal of the arc tangent calculating circuit 191 one symbol before.

Next will be described the operation of this preferred embodiment. Referring to FIG. 5, the O-QPSK modulated carrier a, which is the received demodulated baseband signal, is branched into two, of which one is supplied to the multiplier 11 to be multiplied by the first recovered carrier b from the VCO 15 and the other is supplied to be multiplied by the second recovered carrier c, resulting from π/2 phase shifting of the first recovered carrier by the π/2 phase shifter 13. The output signal d of the multiplier 11, while being entered into the delay circuit 14 having a delay time equal to ½ of the symbol rate, is also entered into the CR field detecting circuit 16.

The output signal d of the multiplier 11 is delayed by the delay circuit 14 by a ½ symbol to become the signal f and, after being timed to the output signal e of the multiplier 12, is supplied to the CR field phase comparator 18, the BTR field phase comparator 19 and the four-phase comparator 20. The output signal e of the multiplier 12 is entered into the CR field detecting circuit 16 and the clock recovery circuit 17. At the same time, it is also supplied to the CR field comparator 18, the BTR field phase comparator 19 and the four-phase comparator 20.

Figure 11:
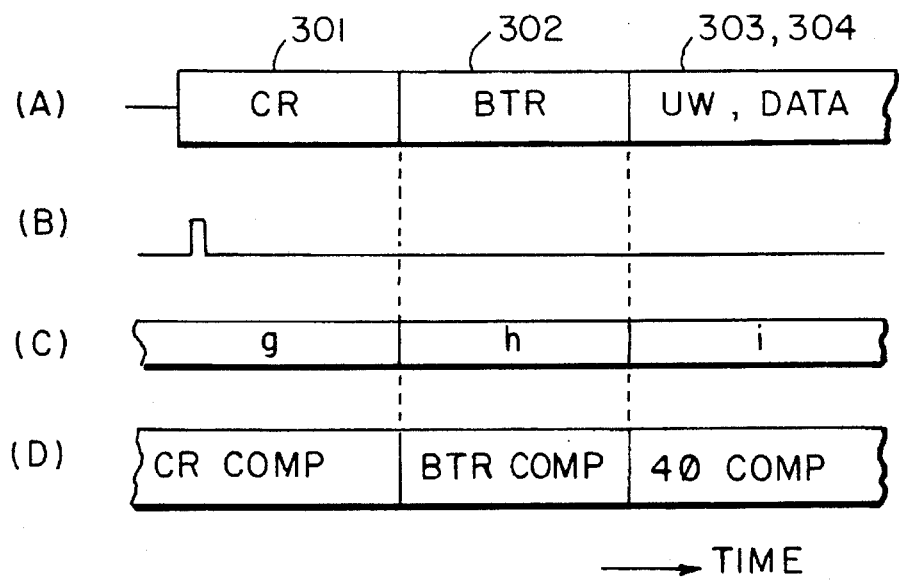
FIG. 11 is a diagram for describing the operation of the first embodiment illustrated in FIG. 5.
Figure 12A:
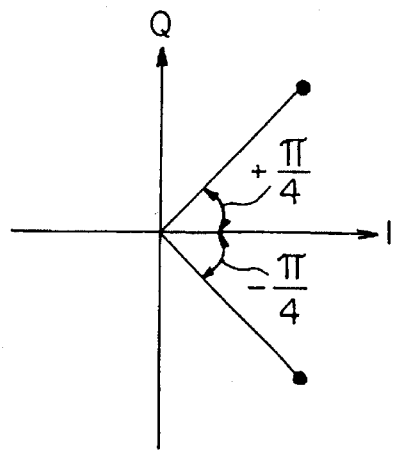
FIGS. 12A–12D are diagrams of the signal vector arrangement on a phase plane in the BTR field.
Figure 12B:
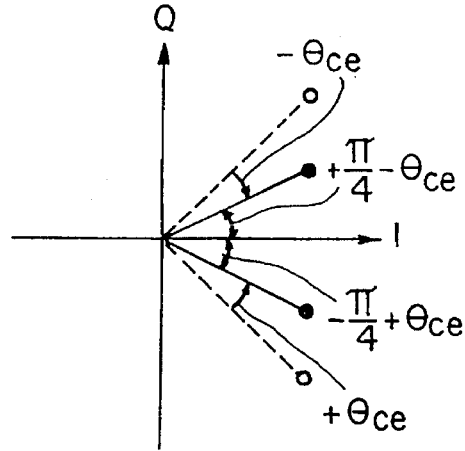
Figure 12C:
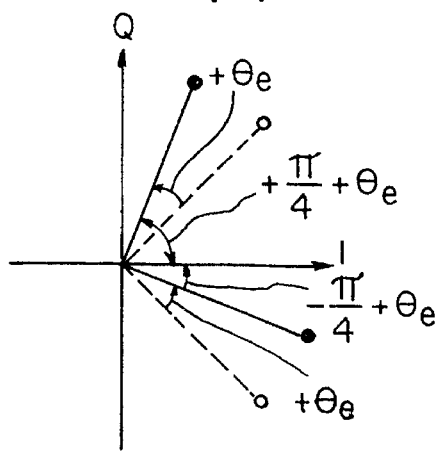
Figure 12D:
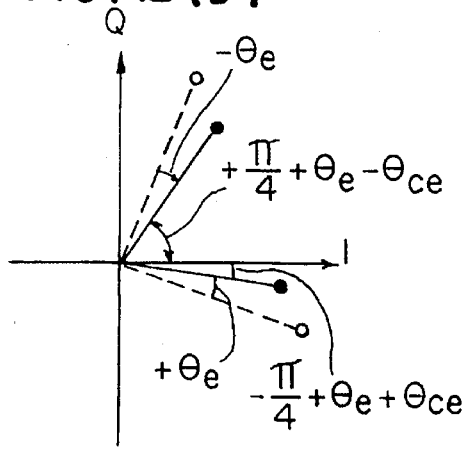

From the multipliers 11 and 12, as shown schematically in FIG. 11 (A), are taken out burst signals in the sequence of the CR field (CR) 301, the BTR field (BTR) 302, the unique word (UW) 303, and the data field (DATA) 304. As described with reference to FIG. 6, the CR field detecting circuit 16, upon detection of said CR field 301 being taken out of the multipliers 11 and 12, generates a detection signal as shown in FIG. 11 (B), and supplies it to the control 21 circuit 21 of FIG. 5.

The control circuit 21, having a built-in timer circuit, counts the number of symbols from the time of detection signal entry, and controls the switching circuit 22 on the basis of pre-memorized information on the preamble length by supplying the switching circuit 22 with switching control signals in accordance with the timings at which the switchover takes place from the CR field 301 to the BTR field 302 and further to the unique word 303.

Under this control, as schematically illustrated in FIG. 11 (C), the switching circuit 22 selects the input signal g of the terminal 22a when the CR field 301 is entered, the input signal h of the terminal 22b when the BTR field 302 is entered, the input signal i of the terminal 22c when the unique word 303 of any subsequent part of the signal is entered, and supplies the selected signal to the loop filter 23 of FIG. 5.

Therefore, the type of phase comparator for inputting to the loop filter 23, as schematically shown in FIG. 11 (D), is the CR field phase comparator 18 when the CR field 301 is entered, the BTR field phase comparator 19 when the BTR field 302 is entered, or the four-phase comparator 20 when the unique word 303 or any subsequent data part of the signal is entered.

In this arrangement, first, while the CR field 301 is being received, the output signal g of the CR field phase comparator 18 is supplied to the loop filter 23, where the high frequency component is filtered, and then the filtered signal is applied to the VCO 15 as control voltage to subject its output oscillation frequency to variable control. The output oscillation frequency of this VCO 15 is entered into the multiplier 11 and the $\pi/2$ phase shifter 13 as recovered carrier to pull in the carrier phase.

Then, while the BTR field 302 is being received, the arc tangent calculating circuit 191 in the BTR field phase comparator 19 calculates the estimated phase value $\theta(t)$ of the symbol at the time t. The estimated phase value of the signal vector during the reception of the BTR field 302, which is an alternating series of binary values, (0101 ... 01) as shown in FIG. 4 (B), on the Q-channel of the received symbol sequence will be as illustrated in FIG. 12, where $\theta_e$ i is the phase error of the carrier and $\theta_{ce}$, the signal point phase error arising from a sample timing error.

FIG. 12 (A) shows the estimated phase value of the signal vector when there is neither a sample timing error nor a carrier phase offset. At this time, since the Q-channel has an alternating series of binary digits while the I-channel is fixed to binary 1's, the estimated phase value of the signal vector will be alternately $+\pi/4$ and $-\pi/4$, changing at each symbol.

FIG. 12 (B) shows the estimated phase value of the signal vector when there is a sample timing error but no carrier phase offset. At this time, since the Q-channel component of the signal vector is an alternating series of binary digits, the signal component diminishes on account of the sample timing error, but the I-channel component, having an all binary 1 bit pattern, is unaffected by the sample timing error, so that the signal point phase error $\theta_{ce}$ due to the sample timing error does not change in absolute value but is inverted in sign with the change in bit between binary 1 and binary 0. Therefore, the signal vector at this time, as indicated by the solid line in FIG. 12 (B), the absolute estimated phase value $\theta(t)$ will be smaller by the signal point phase error $\theta_{ce}$ than in the case of FIG. 12 (A) indicated by the broken line.

FIG. 12 (C) shows the estimated phase value of the signal vector when there is no sample timing error but a carrier phase offset. The signal vector at this time, as indicated by the solid line in FIG. 12 (C), is turned by as much as the phase error $\theta_e$ of the carrier in the same direction as the signal vector in the absence of both sample timing error and carrier phase offset.

Further, FIG. 12 (D) shows the estimated phase value of the signal vector in the presence of both sample timing error and carrier phase offset. The estimated phase value (t) at this time, compared with the signal vector in the presence only of a carrier phase offset as indicated by the broken line in FIG. 12 (D) (the same as in FIG. 12 (C)), is equal in absolute value as indicated by the solid line in FIG. 12 (D) for the same reason as explained with reference to FIG. 12 (B), and smaller by the signal point phase error $\theta_{ce}$.

Thus, the estimated phase value $\theta(t)$ in the presence of both sample timing error and carrier phase offset alternates between $$\theta(t)=(+\pi/4)+\theta_e(t)-\theta_{ce}(t) \qquad (1)$$

and $$\theta(t)=(-\pi/4)+\theta_e(t)+\theta_{ce}(t) \qquad (2)$$

changing at every symbol.

Referring back to FIG. 5, in the one-symbol delay circuit 192 is stored $\theta(t-1)$, the estimated phase value of one symbol before the estimated phase value $\theta(t)$ calculated by said arc tangent calculating circuit 191. The adder 193 adds the estimated phase value $\theta(t)$ calculated by the arc tangent calculating circuit 191 and the estimated phase value $\theta(t-1)$ of one symbol before, supplied from the one-symbol delay circuit 192, and calculates a detected carrier phase value $\theta_{edet}$.

$$\begin{aligned}\theta_{edet}(t) &= \theta(t)+\theta(t-1) \qquad (4)\\ &= (+\pi/4)+\theta_e(t)-\theta_{ce}(t)+\\ &\quad (-\pi/4)+\theta_e(t-1)+\theta_{ce}(t-1)\end{aligned}$$

Here, as the bands of both carrier recovery and of clock recovery are at most small fractions of the symbol rate, generally $\theta_e(t)$ is equal to $\theta_e(t-1)$, and $\theta_{ce}(t)$, equal to $\theta_{ce}(t-1)$ if the interval between one symbol and the next is taken note of. Therefore, the detected carrier phase value $\theta_{edet}$ obtained by the BTR field phase comparator 19 can be represented by the following equation on the basis of the foregoing equation.

$$\begin{aligned}\theta_{edet}(t) &= \theta_e(t)+\theta_e(t-1) \qquad (5)\\ &= 2\theta_e\end{aligned}$$

Accordingly, the detected carrier phase value $\theta_{edet}$ obtained by the BTR field phase comparator 19, as is evident from the above equation, is unaffected by any sample timing error. Therefore, this embodiment of the invention, even if the optimal sample timing is not recovered at the time the BTR field 302 begins, permits carrier recovery to be continued in the BTR field 302, unaffected by the absence of the optimal sample timing.

Figure 1:
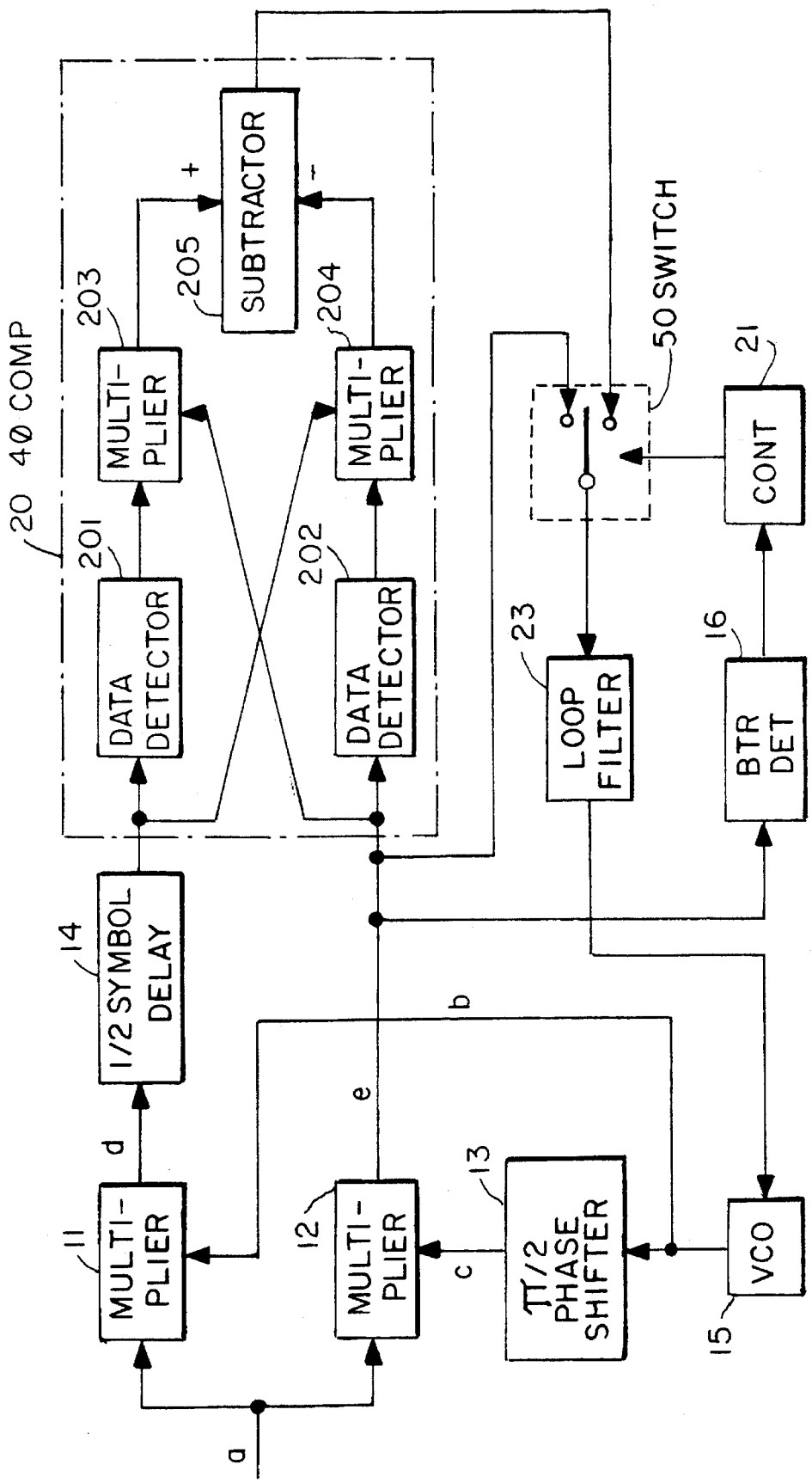
FIG. 1 is a block diagram of a CR circuit according to the prior art.
Figure 2:
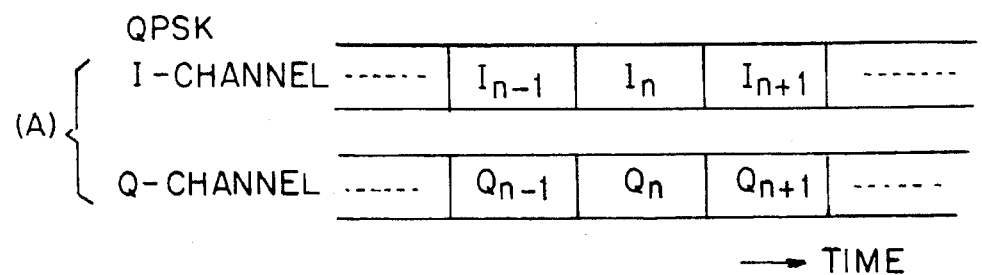
FIG. 2 is a diagram illustrating data in the O-QPSK system and the QPSK system.

Next will be explained the band widening of the loop filter 23. In the CR circuit described in FIG. 1, the control voltage of the VCO is set at a prescribed low level, while the BTR field 302 is being received, by entering the alternating series of binary 1's and 0's into the loop filter to filter it.

In this case, however, as the input signal of the loop filter repeats sign inversions, its oscillation will emerge as jitter in the loop filter output through the pre-envelope of the loop filter. As a result, the stability of the Costas loop against noise correspondingly deteriorates, and the compensation for this deterioration would have to be made by keeping the band of the loop filter somewhat narrow.

By contrast, in this embodiment, the BTR field phase comparator 19 gives the sum of the estimated phase values of adjoining symbols as its output, with the result that the signal (detected carrier phase value $\theta_{edet}$) entered from the phase comparator 29 into the loop filter 23 through the switching circuit 22 is substantially cleared of the oscillation components ($\pm\pi/4$ oscillation and the signal point phase error $\pm\theta_{ce}$ due to a sample timing error) ensuing from alternate inversions of the bit pattern, so that the jitter component in the output signal from the loop filter 23 is significantly suppressed.

Therefore, if this embodiment and the previously proposed circuit are equal in the stability of the Costas loop against noise, this embodiment can have a broader band for the loop filter.

In this manner, while the BTR field 302 is being received, the detected carrier phase value $\theta_{edet}$ obtained from the BTR field phase comparator 19 is supplied to the VCO 15 through the switching circuit 22 and the loop filter 23, making it possible, even if the optimal sample timing is not recovered, to continue stable supply of a recovered carrier of a phase corresponding to the detected carrier phase value $\theta_{edet}$, unaffected by the absence of the optimal sample timing.

Then, as the reception of the BTR field 302 described above comes to an end and that of the unique word 303 begins, the switching circuit 22 selects the output phase error signal of the four-phase comparator 20, and supplies it to the loop filter 23. The four-phase comparator 20, as illustrated in FIG. 10, supplies the phase error signal i, viewed from the nearest one of the four phase stabilization points, by subjecting the sign values of the demodulated signals f and e obtained by the sign discriminators 201 and 202 and signals multiplied by the multipliers 203 and 204 to subtraction by the subtracter 205.

Next will be described a second preferred embodiment of the present invention will reference to the block diagram of FIG. 13. In this diagram, the same constituent elements as in FIG. 5 are assigned respectively the same signs, and their explanation is dispensed with. While the sample timings of the signals of two orthogonal sequences are made identical by the delay circuit 14 in the embodiment illustrated in FIG. 5, inverted clocks relative to normal clocks are made available in this embodiment, and the delay circuit 14 is replaced by D type flip-flops (F/F's) 25, 26, 28 and 29 and an inverter 27 to generate a time delay of sampling clocks by a ½ symbol between the I-channel and the Q-channel.

Figure 13:
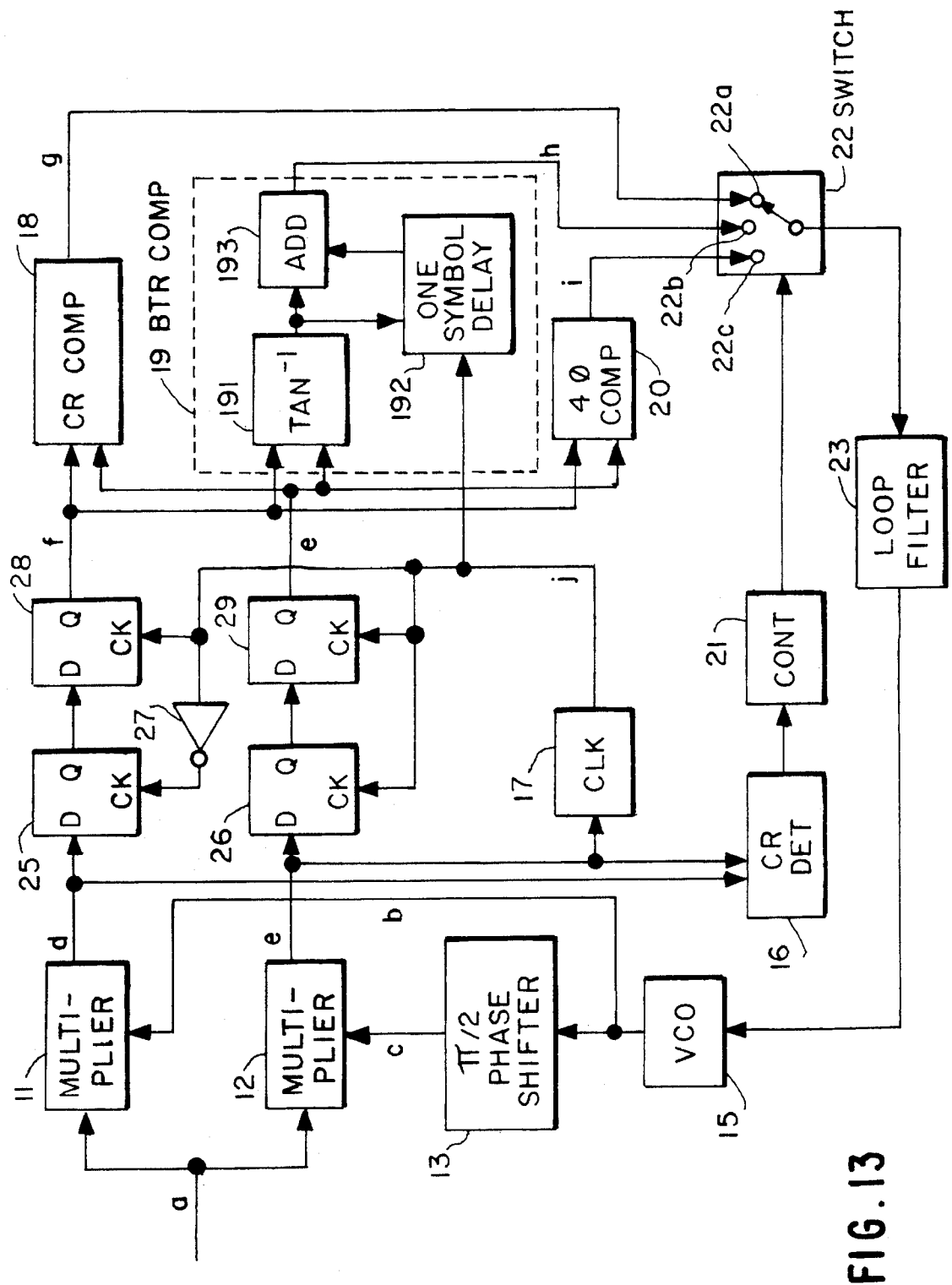
FIG. 13 is a block diagram of a second preferred embodiment of the present invention.

Referring to FIG. 13, a clock j taken out of a clock recovery circuit 117, while being directly inputted to the clock terminal of the D type F/F 26, is also inverted by the inverter 27 and inputted to the clock terminal of the D type F/F 25. The D-type F/F 25 latches (samples) the output signal d of a multiplier 11 at, for instance, the leading edge of the output inverted clock of the inverter 27, and similarly the D-type F/F 26 latches (samples) the output signal e of a multiplier 12 at, for instance, the leading edge of the clock j.

This causes the burst signal d of the I-channel and the burst signal e of the Q-channel to be sampled at timings with the time delay of the ½ symbol of the clock j between them. However, the signal changing points of the two channels still have the time delay of the ½ symbol at the time of outputting from the F/F's 25 and 26.

In view of this remaining time delay, in the embodiment shown in FIG. 13, the signal changing points of the two channels are aligned by inputting the output signals of the D-type F/F's 25 and 26 to the data input terminals of the D-type F/F's 28 and 29, to whose clock terminals the clock j is inputted commonly, and latching (sampling) them again at the same timing.

Figure 14:
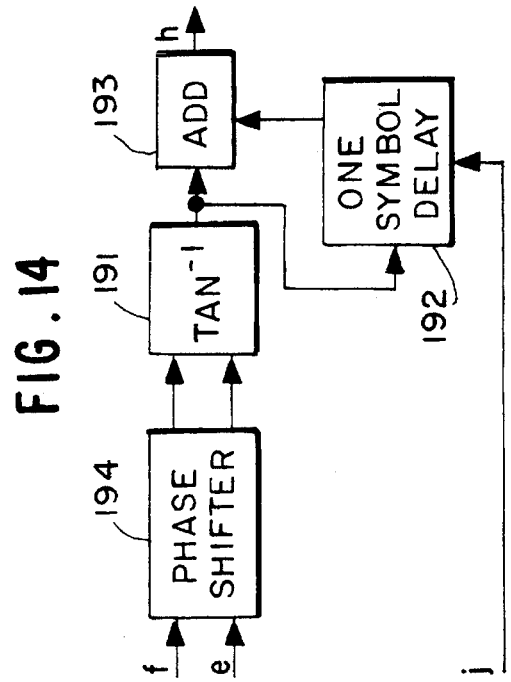
FIG. 14 is a block diagram of another example of the phase comparator for the BTR field.

The present invention is not restricted to the foregoing preferred embodiments. For instance, if the phase (lock point) at which the BTR field is to be pulled in differs from what is supposed in these embodiments, the BTR field phase comparator 19 will be given the configuration illustrated in FIG. 14. Thus a phase shifter 194 is provided on the input side of the arc tangent calculating circuit ($\tan^{-1}$) 191 to bring the signals e and f into phase, so that the subsequent processing can be accomplished in the same manner as in the foregoing embodiments.

Figure 15:
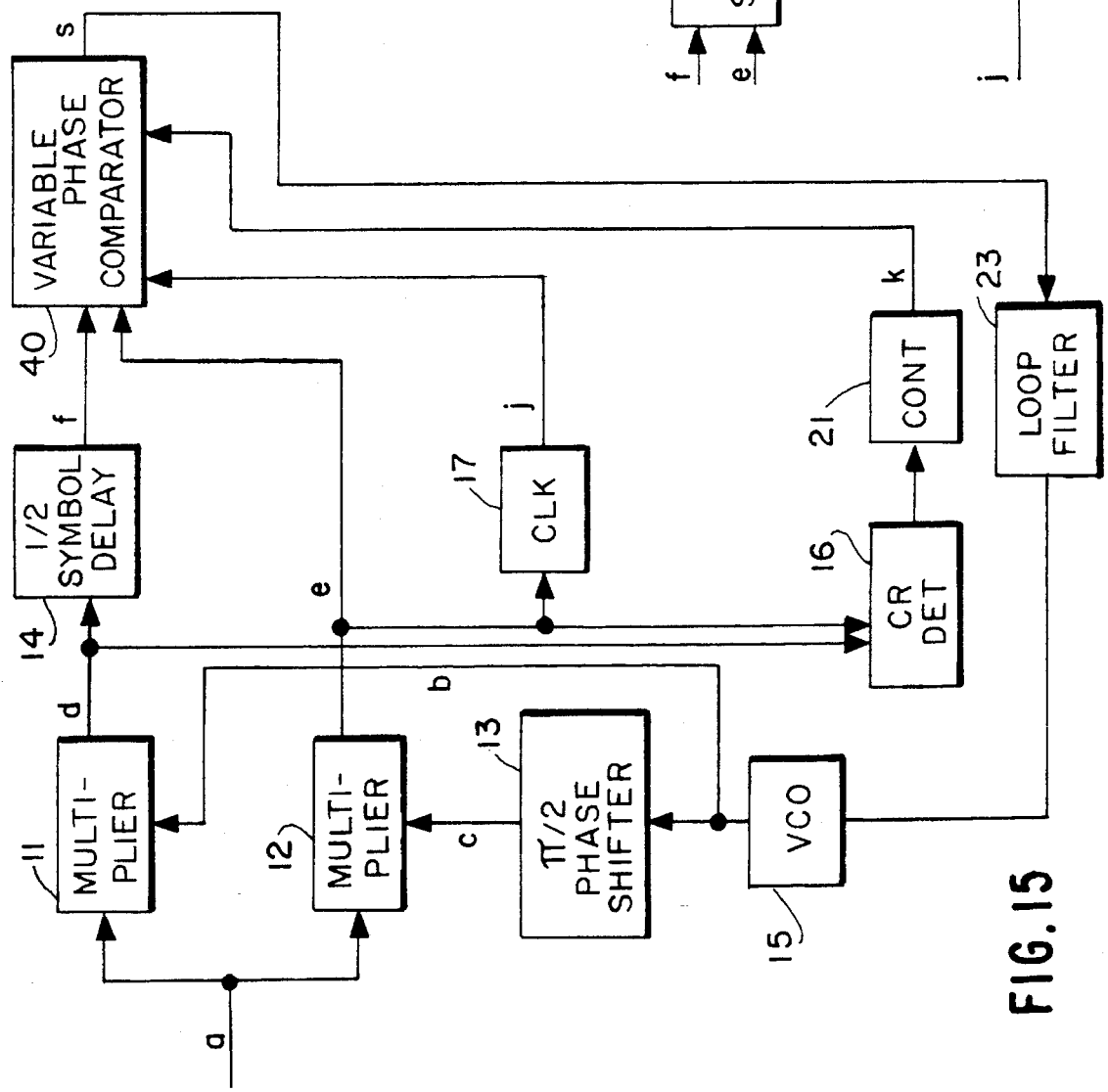
FIG. 15 is a block diagram of a third preferred embodiment of the invention.

A block diagram of a third preferred embodiment of the invention is further given in FIG. 15. In this diagram, the same constituent elements as in FIG. 5 are assigned respectively the same signs, and their explanation is dispensed with. In the embodiment shown in FIG. 5, the output signals of three kinds of phase comparators including the CR field phase comparator 18, the BTR field phase comparator 19 and the four-phase comparator 20 are successively selected by the switching circuit 22 on the basis of the clock from the clock recovery circuit 17. In this third embodiment, however, the output signal of only one type of phase comparator, a variable phase comparator 40, is selected on the basis of a clock from a clock recovery circuit 17. FIG. 16 is a block diagram of one example of the variable phase comparator circuit.

In this diagram, demodulated signals f and e are entered into a variable phase shifter 401, whose output is entered into an arc tangent calculating circuit 191. The output estimated phase value is controlled by switching over between switching circuits 402 and 403 with a control signal k from a control circuit 21 in accordance with the arrivals of the CR field, the BTR field, the unique word field and the data field of burst signals.

Thus the control signal k from the control circuit 21 performs control so that a proper fixed phase shift quantity is set in the variable phase shifter 402. This fixed phase shift quantity is switched so that the output signal of the arc tangent calculating circuit 191 shows a displacement centering on the lock point.

FIG. 17 is a diagram illustrating the operating state of switching by the switching circuits 402 and 403 according to the state of the received signal of FIG. 17 (A). FIG. 17 (C) and FIG. 17 (D) show the state of the signal in the terminal (l, m, n, p, q, r) selected by switching circuits 402 and 403 respectively. Referring to this diagram, in the unique word field and the data field of FIG. 17 (A), the output g of the arc tangent calculating circuit 191 is entered by the switching circuit 402 into a modulo-$\pi/2$ calculating circuit 404 for the calculation of modulo-$\pi/2$ and, after being subjected to subtraction by a $\pi/4$ phase circuit 405 and a subtracter 406, is turned into the output signal of the variable phase comparator 40 by the switching circuit 403.

The module-$\pi/2$ calculating circuit 404, subtracter 406 and $\pi/4$ phase circuit 405 correspond to the four-phase comparator 20 in FIG. 5.

Whereas the third preferred embodiment of the present invention is consistent with the first embodiment of FIG. 5, it obviously is applicable to the second embodiment of FIG. 13 as well.

Figure 18:
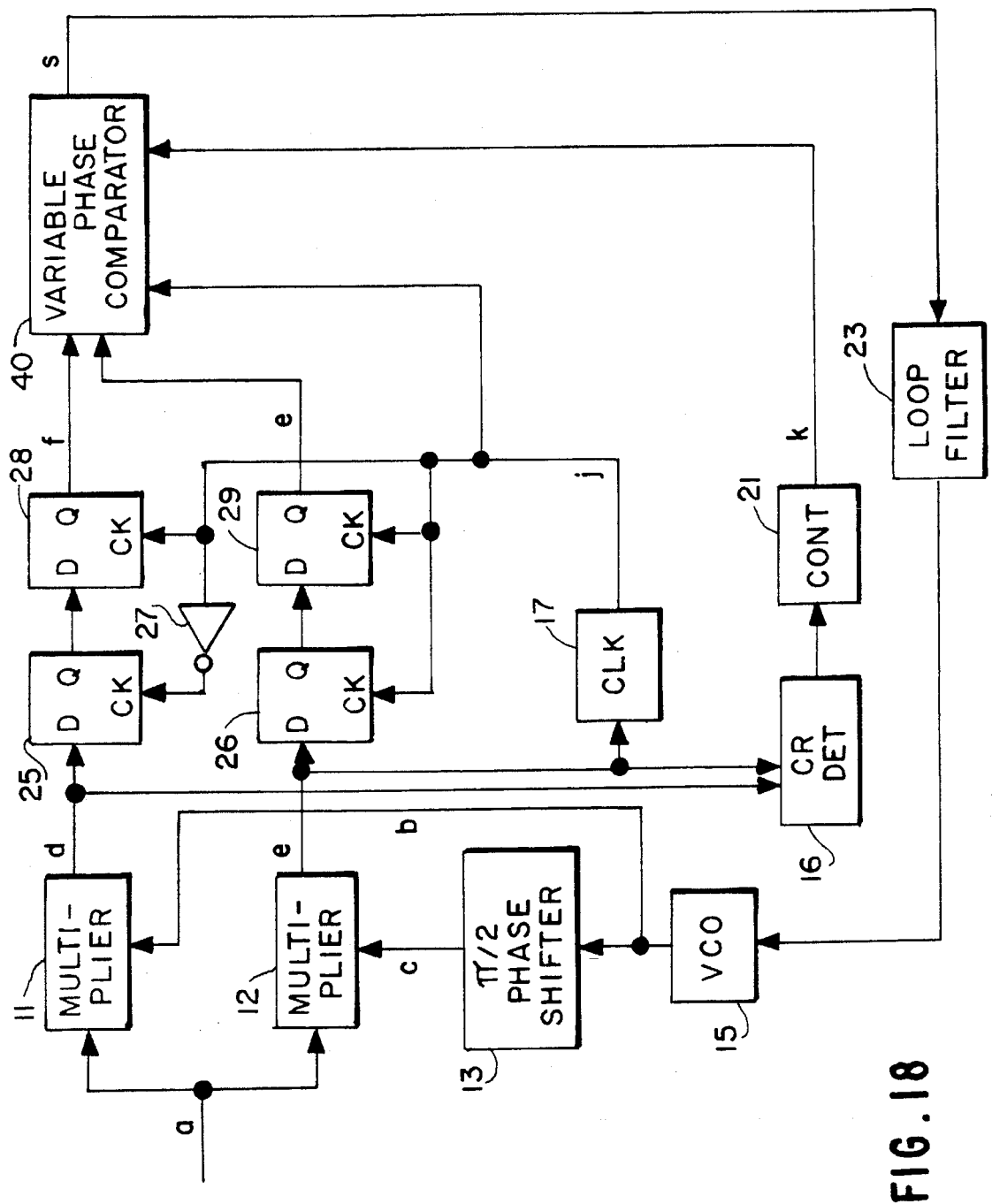
FIG. 18 is a block diagram of a fourth preferred embodiment of the invention.

FIG. 18 is a block diagram of a fourth preferred embodiment of the invention. In the embodiment of this diagram, too, use of the variable phase comparator 40 described with reference to FIG. 15 enables the subsequent processing to be accomplished in the same manner as in the foregoing embodiments by switching one type of phase comparator as controlled by a control circuit 21.

As hitherto described, according to the present invention, a BTR field phase comparator adds, after estimating the phase of the carrier, the estimated phase in each symbol and that of one symbol before, and any phase estimation error, that may arise when an alternating series of two binary values is received in the absence of the optimal sample timing, is cancelled, so that the failure to recover the optimal sample timing at the beginning of the BTR field can be prevented from affecting carrier recovery operation.

Furthermore, by making scarce any oscillation component due to the repeated alternation of binary values in the bit pattern of the output signal of the BTR field phase comparator, the jitter component of the output of the selector means is significantly suppressed to make it possible to increase the stability of the Costas loop against noise and thereby to realize the band spreading of the loop filter.

What is claimed is:

1. A carrier recovery (CR) circuit for recovering carriers from Offset Quadrature Phase Shift Keying (O-QPSK) modulated carriers, in which each of two orthogonal sequences of burst signals modulated by an O-QPSK system has a preamble field including a CR field and a bit timing recovery (BTR) field in a time series in that order and a unique word and a data field following said preamble field, and said CR field in both sequences has a pattern fixed to one of binary digits values while said BTR field of one of the two sequences has a pattern fixed to one of two binary values and that of the other sequence of the two sequences has a pattern of an alternating series of binary digits values, comprising:

first and second multiplying means for multiplying said O-QPSK modulated carriers by respectively first and second recovered carriers differing from each other by a $\pi/2$ phase;

a CR detecting circuit for detecting said CR field from the output signals of said first and second multiplying means;

a ½ symbol delay circuit for delaying the output signal from one of said first and second multiplying means by ½ of the symbol rate from the other of said first and second multiplying means;

a clock recovery circuit for recovering a sampling clock on the basis of the output signal from either one of said first and second multiplying means;

a phase comparator having one phase stabilization point for the CR field for detecting phase difference between one delayed by said ½ symbol delay circuit and the other not delayed from the output signals of said first and second multiplying means and generating first output signals;

a phase comparator having two phase stabilization points for the BTR field for detecting phase difference between one delayed by said ½ symbol delay circuit and the other not delayed from the output signals of said first and second multiplying means and generating second output signals;

a four-phase comparator having four phase stabilization points for said unique word and data field for detecting phase difference between one delayed by said ½ symbol delay circuit and the other not delayed from the output signals of said first and second multiplying means and generating third output signals;

selector means for successively selecting one out of said first output signals, said second output signals, and said third output signals on the basis of clocks from said CR detecting circuit; and a recovered carrier generating circuit for generating a recovered carrier on the basis of the output signal of said selector means.

2. A CR circuit, as claimed in claim 1, further including in place of said ½ symbol delay circuit, first and second latching circuits for latching the output signals of said first and second multiplying means with first and second clocks generated from an output clock of said clock recovery circuit and given an inverted phase from each other; and third and fourth latching circuits for latching the output signals of said first and second latching circuits with said sampling clock recovered by said clock recovery circuit.

3. A carrier recovery circuit, as claimed in claim 1, wherein said BTR field phase comparator comprises an arc tangent calculating circuit for calculating the arc tangent of the one output signal delayed by said ½ symbol delay circuit and the other output signal not delayed from either said first or said second multiplying means to obtain an estimated phase value at a symbol rate; a one-symbol delay circuit for delaying said estimated phase value calculated by said arc tangent calculating circuit by one symbol rate; and an adder for adding said estimated phase value of said arc tangent calculating circuit and the output value of the one-symbol delay circuit to supply a detected carrier phase value.

4. A carrier recovery circuit, as claimed in claim 1, wherein said recovered carrier generating circuit has a loop filter for filtering the output signal of said selector means and a voltage controlled oscillator (VCO) for supplying an oscillation frequency controlled by an output signal level of said loop filter.

5. A carrier recovery circuit, as claimed in claim 1, wherein said selector means has a control circuit for discriminating the CR field, the BTR field, said unique word and data field by counting a number of symbols on the basis of pre-memorized information on the preamble length from a time of detection signal entry detected by said CR field detecting circuit, and selecting one of the output signals of said phase comparator having one phase stabilization point for the CR field, said phase comparator having two phase stabilization points for the BTR field, and said four-phase comparator.

6. A carrier recovery (CR) circuit for recovering carriers from Offset Quadrature Phase Shift Keying (O-QPSK) modulated carriers, in which each of two orthogonal sequences of burst signals, modulated by an O-QPSK system, has a preamble field including a CR field and a bit timing recovery (BTR) field in a time series in that order and a unique word and data field following said preamble field, and said CR field in both sequences has a pattern fixed to one of binary values while said BTR field of one of the two sequences has a pattern fixed to one of two binary values and that of the other sequence of the two sequences has a pattern of an alternating series of binary values, comprising:

first and second multiplying means for multiplying said O-QPSK modulated carriers by respectively first and second recovered carriers differing from each other by a $\pi/2$ phase;

a CR detecting circuit for detecting said CR field from the output signals of said first and second multiplying means;

a ½ symbol delay circuit for delaying the output signal from one of said first and second multiplying means by ½ of the symbol rate from the other of said first and second multiplying means;

a clock recovery circuit for recovering a sampling clock on the basis of the output signal from either one of said first and second multiplying means;

a variable phase comparator having one phase stabilization point for said CR field, two phase stabilization points for said BTR field and four phase stabilization points for said unique word and data field for detecting phase difference between one delayed by said ½ symbol delay circuit and the other not delayed from the output signals of said first and second multiplying means; and a recovered carrier generating circuit for generating a recovered carrier on the basis of the output signal of said variable phase comparator.

7. A CR circuit, as claimed, in claim 6, further including, in place of said ½ symbol delay circuit, first and second latching circuits for latching the output signals of said first and second multiplying means with first and second clocks generated from the output clock of said clock recovery circuit and given an inverted phase from each other; and third and fourth latching circuits for latching the output signals of said first and second latching circuit with said sampling clock recovered by said clock recovery circuit.

8. A CR circuit, as claimed in claim 6 or 7, wherein said variable phase comparator has a variable phase shifter, into which the output signals of said first and said second multiplying means are entered, for varying its phase with an output signal of a control circuit;

an arc tangent calculating circuit for calculating the arc tangent of a phase value of said output signal of said variable phase shifter to obtain an estimated phase value of a symbol rate;

switching means for, in accordance with said output signal of said control circuit, outputting the output signal of said arc tangent calculating circuit when said burst signals are in said CR field of the burst signals, switching the output signal of said arc tangent calculating circuit to an output signal of an adder for adding said estimated phase value of said arc tangent calculating circuit and an output phase value resulting from the delaying of said estimated phase value of said arc tangent calculating circuit by one symbol rate when said burst signals are in said BTR field, and switching the output signal of said arc tangent calculating circuit to an output signal of a subtracter for subtracting an output signal of a modulo-$\pi/2$ circuit for calculating modulo-$\pi/2$ of said output of said arc tangent calculator circuit from an output signal of a $\pi/4$ phase shifting circuit for shifting $\pi/4$ phase when said burst signals are in said unique word and data field.

* * * * *

UNITED STATES PATENT AND TRADEMARK OFFICE
CERTIFICATE OF CORRECTION

PATENT NO. : 5,485,489
DATED : January 16, 1996
INVENTOR(S) : Kenichiro CHIBA

It is certified that error appears in the above-indentified patent and that said Letters Patent is hereby corrected as shown below:

ABSTRACT, line 10, delete "193".

Col. 3, line 54, delete "1".

Col. 6, line 66, delete "21".

Signed and Sealed this

Eleventh Day of June, 1996

Attest:

BRUCE LEHMAN

*Attesting Officer*     *Commissioner of Patents and Trademarks*